United States Patent [19]

Kamatani

[11] Patent Number: 5,587,981
[45] Date of Patent: Dec. 24, 1996

[54] MULTI-STANDARD OPTICAL DISK READING METHOD HAVING DISTINCTION PROCESS

[76] Inventor: Yasuo Kamatani, 2-12-2 Yokoyama, Sagamihara-shi, Kanagawa 229, Japan

[21] Appl. No.: 523,461

[22] Filed: Sep. 5, 1995

[51] Int. Cl.⁶ ........................................................ G11B 7/00
[52] U.S. Cl. ............................ 369/58; 369/54; 369/44.26
[58] Field of Search ............................ 369/44.26, 44.25, 369/13, 54, 47, 48, 116, 94, 58

[56] References Cited

U.S. PATENT DOCUMENTS

| | | | |
|---|---|---|---|
| 4,755,980 | 7/1988 | Yoshimaru et al. | 369/54 X |
| 5,003,521 | 3/1991 | Yoshida et al. | 369/44.25 |
| 5,289,451 | 2/1994 | Ashinuma et al. | 369/48 |
| 5,465,245 | 11/1995 | Yanagawa | 369/44.25 X |

*Primary Examiner*—Thang V. Tran

[57] ABSTRACT

An optical disk reading method to provide an optical disk reading system which is able to reproduce encoded optical data from varied optical disk format fabricated in accordance with different standard. Before start reproducing data on an optical disk, a set of standard data which includes data of total number of data layer, pit density and track pitch is identified by reading a total of contents data encoded in a reading region of the optical disk. If the total of contents data is not encoded on the optical disk, any encoded pits on the optical disk is processed until the standard of the optical disk is identified. After the standard of the optical disk is identified, modulation of each servo circuit such as a focusing lens servo circuit and a tracking servo circuit is settled to start reproducing data on the optical disk.

3 Claims, 2 Drawing Sheets

MULTI-STANDARD OPTICAL DISK READING METHOD HAVING DISTINCTION PROCESS

BACKGROUND OF THE INVENTION

1. Field of the Invention

This invention relates to optical data storage systems. More specifically, this invention relates to an optical reading method for an optical data reproducing system which is able to reproduce encoded data at different pit density on varied types of optical disk format.

2. Description of the Prior Art

Initialized by the vast increase in information that needs to be processed, optical data storage system have become very important system particularly because of their high storage density per area. Most of the recent optical information storage systems rotating single optical disk are used on which the information is digitally stored in concentric circular tracks in an ordered, predifined manner to allow chronological fast reading and fast random access to desired pits of data.

At present, varied type of optical disk systems are provided, for example, compact disk (CD) system, Mini-Disk (MD) system and multilayered optical disk for digital video disk (DVD) system. Each of these optical disk format is fabricated dependent upon different standard. And thickness or pit density of the each optical disk is different from one and another. An optical reading system is needed which is able to reproduce the encoded data from any types of optical disk format.

SUMMARY OF THE INVENTION

The present invention has for its object to provide a multi-standard optical disk reading system having distinction process, which can read encoded pits on varied types of optical disk format.

The object of the present invention can be achieved by an optical disk reading method having distinction process, the steps comprising: to read a total of contents (TOC) data in a read-in region of an optical disk before starting reproduction process, to read any encoded pits until identifying a type of the optical disk format if the TOC data is not encoded on the optical disk, to collate the TOC dam or any processed data with stored data in a memory, to obtain data about standard of the optical disk from the memory, to set up modulation of first stage position of a focusing lens or to select a focusing lens, to set up modulation of a tracking servo, and to start reproducing data on the optical disk.

In an optical disk such as a compact disk (CD), a Mini-Disk (MD) and a digital video disk (DVD), a TOC data is encoded in the read-in region of the disk. And at first, the TOC data is reproduced by a pickup head. The TOC data includes total number of portions of information such as music, movie or computer program, and time consuming data for reproduction. Also, the TOC data of some types of optical disk contains address of each of the information and reproduction time of each of the information.

In addition, the TOC data also represents the standard of the optical disk, such as pit density, total data capacity and reproducing speed. Such data about the standard of the optical disk can be encoded as TOC data. Otherwise, the standard of the optical disk is identified by reproducing the TOC data which is encoded in accordance with the standard. The data about the standard of the optical disk is better to be contained in the TOC data in order to start reproducing process faster. However even the data about the standard is not contained in TOC data, the standard of the optical disk can be identified by processing TOC data or certain amount of pits to certify the total number of data encoded surfaces, the pit density and track pitch. After making sure the standard of the optical disk, each movement of a focusing lens servo, a tracking servo or a spindle servo is determined to reproduce the data on the optical disk. The focusing lens servo is modulated to focus laser beam onto encoded pit on the optical disk by moving the focusing lens or changing the focusing lens. If the optical disk has more than one data surface, the focusing lens servo has to be modulated to read each of the data surface. The tracking servo and the spindle servo are modulated in order to trace the encoded pit lane on the optical disk with the focal point.

For a fuller understanding of the nature and advantages of the present invention reference should be made to the following detailed description taken in conjunction with the accompanying drawings.

DETAILED DESCRIPTION OF THE PREFERRED EMBODIMENT

Embodiments of the present invention will be explained with reference to the drawings.

Figure 1:
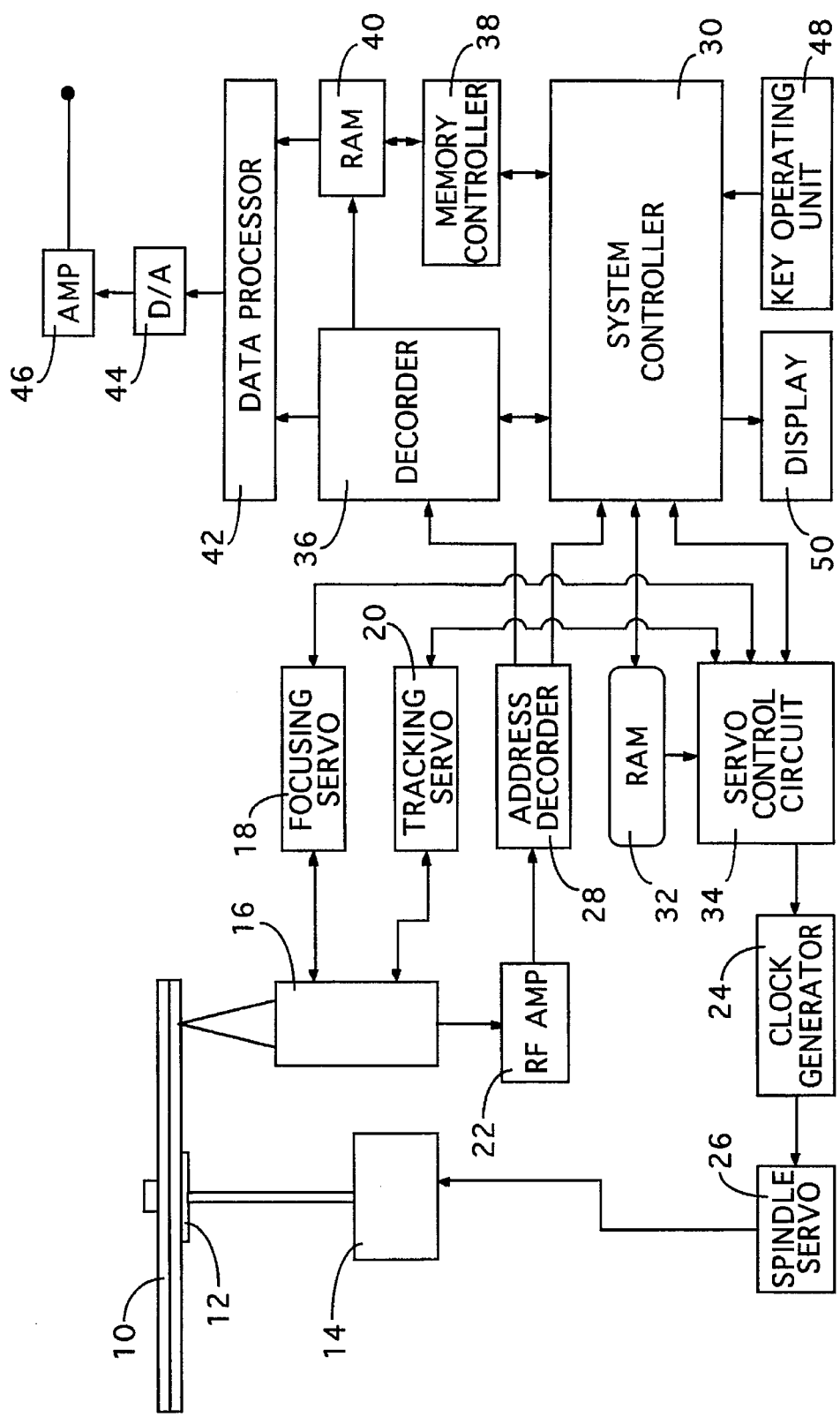
FIG. 1 shows block diagram of an example of an optical reading apparatus to which the present invention can be applied.

FIG. 1 is a block diagram of an example of an optical reading apparatus to which the optical disk reading methods of the present invention can be applied. An optical disk 10 represent one of optical disk formats among a compact disk (CD), a Mini-Disk (MD), a digital video disk (DVD) or the other. The optical disk 10 is mounted on and secured by a turntable 12 to be rotated by a spindle motor 14. Encoded pit on the optical disk 10 is read by a pickup 16 which includes a laser diode, a focusing lens, a focusing lens actuator, a tracking actuator and a photo-detector. The output signal from the pickup 16 is transmitted to a focusing servo circuit 18, a tracking servo circuit 20 and an RF amplifier 22. According to focusing error signal, the focusing servo circuit 18 modulates the focusing lens actuator to move the focusing lens. And according to tracking error signal, the tracking servo circuit 20 modulates the tracking actuator to move the pickup 16. A clock generator 24 produces a demodulating reproduction clock signal which is generated to a spindle servo circuit 26. The spindle servo circuit 26 modulates the spindle motor 14 in order to track linear velocity of the optical disk 10.

The output signal applied to the RF amplifier 22 from the pickup 16, is transmitted to an address decoder 28. Then the decoded signal is processed by a system controller 30. The system controller 30 has a signal processor which recognizes pit density of the optical disk 10, accompanying with a ROM (Read Only Memory) 32. The signal from the photo-detector in the pickup 16 is amplified by the RF amplifier 22, and the amplified signal is decoded by an address decoder 28 to be collated by the system controller 30 with the ROM 32 which stores data about pit density standards. After the standard of the optical disk 10 is identified, a servo control circuit 34 determines position or selection of the focusing lens by modulating the focusing servo circuit 18, and the tracking servo circuit 20 is modulated to move the pickup 16 in order to trace the pit lane which is fabricated in accordance with the pit density standard.

The output signal of the RF amplifier 22 in the clock generator 24 together with the reproduction clock signal is applied to the address decoder 28 including a frame synchronizing circuit. The reproduction clock signal is converted by the address decoder 28, and the converted clock signal is transmitted to the servo control circuit 34 which modulate or stabilize the spindle motor 14 accompanying with the clock generator 24 and the spindle servo circuit 26. The demodulation data signal of the address decoder 28 is transmitted to a decoder 36 which also controls a memory controller 38. The decoded data signal is stored in a RAM (Random Access Memory) 40 for a shock proof function or a continuous data processing function with multi data surface optical disk. The decoded data signal by the decoder 36 or the stored data signal by the RAM 40 is processed by a data processor 42, and the processed data signal is converted from digital signal to analog signal by a D/A (digital to analog) converter 44. Then, after the data signal is amplified by a amplifier 46, the data reproduction is completed.

Each of a control signal of the servo control circuit 34, the address decoder 28, the decoder 36 and the memory controller 38 is supplied from a system controller 30. The system controller 30 is operated by an operation signal from a key operating unit 48 which transmits all operating signal of a user or an operator. The system controller 48 also controls a display unit 50 to show the data reproducing status to the operator.

Figure 2:
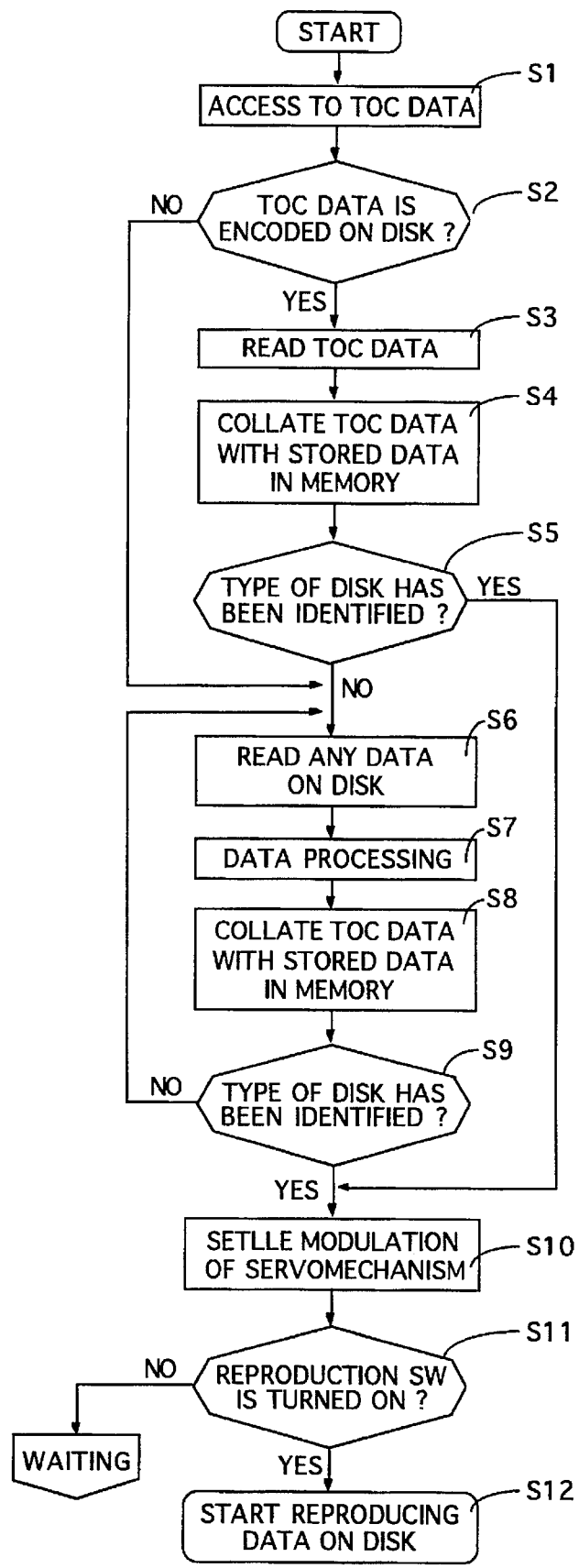
FIG. 2 is a flowchart for a description of a multi-standard optical disk reading method of the present invention.

FIG. 2 shows a flowchart of an operation processing in the system controller 30 in FIG. 1. When a power switch is turned on and the optical disk is mounted on the turntable, the system controller operates the pickup to access to the TOC data by modulating the servo control circuit, tracking servo circuit and focusing servo circuit (step 1: S 1 ). In step 2 (S2), the system controller recognizes whether the TOC data is encoded on the optical disk or not. When the TOC data is encoded on the optical disk, the TOC data is read with an operation of the system controller (S3). Then the read TOC data is collated with stored data in the RAM to identify type of the optical disk format along with its total number of data layers and pit density (S4). In the step 5 (S5), the system controller determines whether type of the optical disk along with its total number of data layers and its pit density standard is identified or not. In case that the TOC data is not encoded on the optical disk in step 2 (S2) and the case that type of the optical disk is not identified in step 5 (S5), the system controller operates the pickup to read any data on the optical disk by modulating the servo control circuit, tracking servo circuit and the focusing servo circuit (S6). In step 7 (S7), the system controller operates the decoder to process the data. Then the processed data is collated with stored data in the RAM to identify type of the optical disk format along with its total number of data layers and its pit density (S8). In the step 9 (S9), the system controller determines whether type of the optical disk along with its total-number of data layers and its pit density standard is identified or not. In case that type of the optical disk is not identified in step 9 (S9), the process has to go back to step 6 (S6). When type of the optical disk is identified in step 5 (S5) or step 9 (S9), the system controller determines each set up of the all servo circuit dependent upon the recognized type of the optical disk (S10). In step 10 (S10), the system controller determines each modulation such as the focusing servo circuit, tracking servo circuit or spindle servo circuit. In the step 10 (S10), the focusing servo circuit modulates the focusing lens actuator to move the focusing lens or change the focusing lens, the tracking servo circuit modulates the tracking actuator to move the pickup, and the spindle servo circuit modulates the spindle motor to track linear velocity of the optical disk. Also in step 10 (S10), the system controller can determine which decoding circuit is used to process the data dependent upon the type of the optical disk. When a data reproduction switch is turned on in step 11 (S11), the system controller starts reproducing data on the optical disk in step 12 (S12). When a data reproduction switch is not turned on in step 11 (S11), the data reproducing has to be waited.

Although the invention has been particularly shown and described, it is contemplated that various changes and modification may be made without departing from the scope of the invention as set forth in the following claims.

What is claimed is:

1. An optical disk reading method comprising the steps of:
   reading a total of contents data in a read-in region of an optical disk to identify total number of data layers and pit configuration standard of the optical disk; and
   settling modulation of servomechanism means dependent upon the total of contents data;
   (a) the servomechanism means including:
      a focusing lens servo to modulate position of a focusing lens; and
      a tracking servo to modulate movement of a pickup.
2. An optical disk reading method comprising the steps of:
   reading a total of contents data in a read-in region of an optical disk to identify total number of data layers and pit configuration standard of the optical disk;
   collating the total of contents data with an optical disk standard data which is stored in a memory; and
   settling modulation of servomechanism means dependent upon the optical disk standard data which corresponds with the total of contents data;
   (b) the servomechanism means including:
      a focusing lens servo to modulate position of a focusing lens; and
      a tracking servo to modulate movement of a pickup.
3. An optical disk reading method comprising the steps of:
   processing an optical signal reflected from encoded pits on an optical disk until total number of data layers and pit configuration standard of the optical disk is identified;
   collating the processed optical signal with an optical disk standard data which is stored in a memory; and
   settling modulation of servomechanism means dependent upon the optical disk standard data which corresponds with the processed optical signal;
   (c) the servomechanism means including:
      a focusing lens servo to modulate position of a focusing lens; and
      a tracking servo to modulate movement of a pickup.

* * * * *

(12) EX PARTE REEXAMINATION CERTIFICATE (7232nd)
United States Patent
Kamatani

(10) Number: US 5,587,981 C1
(45) Certificate Issued: Dec. 15, 2009

(54) MULTI-STANDARD OPTICAL DISK READING METHOD HAVING DISTINCTION PROCESS

(75) Inventor: Yasuo Kamatani, Sagamihara (JP)

(73) Assignee: Laser Dynamics, Inc., Sagamihara, Kanagawa-Ken (JP)

Reexamination Request:
No. 90/008,937, Nov. 20, 2007

Reexamination Certificate for:
Patent No.: 5,587,981
Issued: Dec. 24, 1996
Appl. No.: 08/523,461
Filed: Sep. 5, 1995

(51) Int. Cl.
*G11B 27/32* (2006.01)
*G11B 19/12* (2006.01)
*G11B 7/00* (2006.01)
*G11B 7/0037* (2006.01)
*G11B 7/09* (2006.01)

(52) U.S. Cl. ............... 369/47.54; 369/44.26; 369/47.55; 369/53.2

(58) Field of Classification Search .................. None
See application file for complete search history.

(56) References Cited

U.S. PATENT DOCUMENTS

| | | |
|---|---|---|
| 3,946,347 A | 3/1976 | Wohlmut |
| 3,999,009 A | 12/1976 | Bouwhuis |
| 4,025,949 A | 5/1977 | Whitman |
| 4,044,378 A | 8/1977 | Laub |
| 4,090,031 A | 5/1978 | Russell |
| 4,450,553 A | 5/1984 | Holster et al. |
| 4,755,980 A | 7/1988 | Yoshimaru et al. |
| 4,905,215 A | 2/1990 | Hattori et al. |
| 4,972,399 A | 11/1990 | Miyasaka |
| 4,977,553 A | 12/1990 | Yokogawa |
| 4,989,195 A | 1/1991 | Suzuki |
| 5,003,521 A | 3/1991 | Yoshida et al. |
| 5,031,162 A | 7/1991 | Morimoto et al. |
| 5,097,464 A | 3/1992 | Nishiuchi et al. |
| 5,136,569 A | 8/1992 | Fennema et al. |
| 5,202,874 A | 4/1993 | Zucker et al. |
| 5,202,875 A | 4/1993 | Rosen et al. |
| 5,204,852 A | 4/1993 | Nakagawa et al. |
| 5,235,581 A | 8/1993 | Miyagawa et al. |
| 5,235,583 A | 8/1993 | Jongenelis et al. |
| 5,244,774 A | 9/1993 | Usami et al. |
| 5,251,198 A | 10/1993 | Strickler |
| 5,255,262 A | 10/1993 | Best et al. |
| 5,263,011 A | 11/1993 | Maeda et al. |
| 5,278,816 A | 1/1994 | Russell |

(Continued)

FOREIGN PATENT DOCUMENTS

| | | |
|---|---|---|
| EP | HEI4-123320 | 4/1992 |
| EP | 0 580 873 A1 | 2/1994 |
| EP | 0 592 192 A2 | 4/1994 |
| EP | 0 673 034 A2 | 9/1995 |
| EP | 0 674 309 A1 | 9/1995 |

(Continued)

OTHER PUBLICATIONS

"Optical Disk Family", IBM Technical Disclosure Bulletin, vol. 30, No. 2, Jul. 1987, pp. 667–669.

(Continued)

*Primary Examiner*—Charles Craver

(57) ABSTRACT

An optical disk reading method to provide an optical disk reading system which is able to reproduce encoded optical data from varied optical disk format fabricated in accordance with different standard. Before start reproducing data on an optical disk, a set of standard data which includes data of total number of data layer, pit density and track pitch is identified by reading a total of contents data encoded in a reading region of the optical disk. If the total of contents data is not encoded on the optical disk, any encoded pits on the optical disk is processed until the standard of the optical disk is identified. After the standard of the optical disk is identified, modulation of each servo circuit such as a focusing lens servo circuit and a tracking servo circuit is settled to start reproducing data on the optical disk.

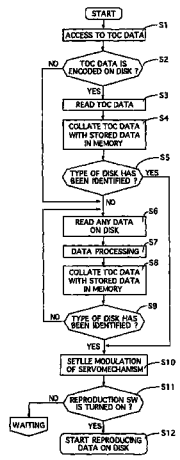

U.S. PATENT DOCUMENTS

| | | |
|---|---|---|
| 5,287,335 A | 2/1994 | Ichiyama |
| 5,289,451 A | 2/1994 | Ashinuma et al. |
| 5,373,499 A | 12/1994 | Imaino et al. |
| 5,381,392 A | 1/1995 | Hira |
| 5,381,401 A | 1/1995 | Best et al. |
| 5,408,453 A | 4/1995 | Holtslag et al. |
| 5,410,530 A | 4/1995 | Best et al. |
| 5,414,451 A | 5/1995 | Sugiyama et al. |
| 5,428,597 A | 6/1995 | Satoh et al. |
| 5,446,565 A | 8/1995 | Komma et al. |
| 5,446,724 A | 8/1995 | Tabe et al. |
| 5,452,279 A | 9/1995 | Yokota et al. |
| 5,463,602 A | 10/1995 | Oka et al. |
| 5,465,245 A | 11/1995 | Yanagawa |
| 5,487,060 A | 1/1996 | Rosen et al. |
| 5,499,231 A | 3/1996 | Fennema et al. |
| 5,502,702 A | 3/1996 | Nakajo |
| 5,513,170 A | 4/1996 | Best et al. |
| 5,526,338 A | 6/1996 | Hasman et al. |
| 5,540,966 A | 7/1996 | Hintz |
| 5,541,900 A | 7/1996 | Ito et al. |
| 5,555,537 A | 9/1996 | Imaino et al. |
| 5,561,643 A | 10/1996 | Yamazaki et al. |
| 5,574,706 A | 11/1996 | Verboom et al. |
| 5,576,107 A | 11/1996 | Hirabayashi et al. |
| 5,598,398 A | 1/1997 | Best et al. |
| 5,677,903 A | 10/1997 | Holtslag et al. |
| 5,684,773 A | 11/1997 | Hayashi |
| 5,734,787 A | 3/1998 | Yonemitsu et al. |
| 5,831,952 A | 11/1998 | Yamada et al. |

FOREIGN PATENT DOCUMENTS

| | | |
|---|---|---|
| EP | 0 674 316 A2 | 9/1995 |
| EP | 0 658 887 A1 | 2/2000 |
| JP | 61-258367 | 11/1986 |
| JP | HEI3-173936 | 7/1991 |
| JP | 4103074 A | 4/1992 |
| JP | 6310980 A | 10/1994 |
| JP | 7-6490 | 1/1995 |

OTHER PUBLICATIONS

Defendant BenQ Corporation's Preliminary Invalidity Contentions, dated Nov. 29, 2004, *Yasuo Kamatani et al.,* v. *BenQ Inc.,* Civ. Action No. 2:03–cv–00437 (E.D. Tex.).

Defendants' Final Invalidity Contentions; dated Aug. 18, 2005; *Yasuo Kamatami et al.* v. *BenQ Inc.,* Civ. Action No. 2:03–cv–00437 (E.D. Tex.).

Expert Report of Hal J. Rosen dated Oct. 19, 2005; *Yasuo Kamatani et al.,* v. *BenQ Inc.,* Civ. Action No. 2:03–cv–00437 (E.D. Tex.).

Expert Report of Timothy Drabik on Invalidity of United States Pat. No. 5,587,981; dated Oct. 19, 2005; *Yasuo Kamatani et al.* v. *BenQ Inc.,* Civ. Action No. 2:03–cv–00437 (E.D. Tex.).

Expert Report of Andrew J. Dillon, dated Oct. 29, 2005, *Yasuo Kamatani et al.* v. *BenQ Inc.,* Civ. Action No, 2:03–cv–00437 (E.D. Tex.).

Supplement to Expert Report of Timothy Drabik on Invalidity of United States Pat. No. 5,587,981; dated Nov. 7, 2005; *Yasuo Ka.matani et al.* v. *BenQ Inc.,* Civ. Action No. 2:03–cv–00437 (E.D. Tex.).

Rebuttal Expert Report of Dennis Howe as to the Validity of Claim 3 of the U.S. Pat. No. 5,587,981, and the Inequitable Conduct Issues Related Thereto; dated Nov. 16, 2005; *Yasuo Kamatani et al.* v. *BenQ Inc.,* Civ. Action No. 2:03–cv–00437 (E.D. Tex.).

Expert Report of Jack C. Goldstein; dated Nov. 16, 2005; *Yasuo Kamatani et al.,* v. *BenQ Inc.,* Civ. Action No. 2:03–cv–00437 (E.D. Tex.).

First Supplement to Expert Report of Hal J. Rosen; dated Nov. 21, 2005; *Yasuo Kamatani et al.* v. *BenQ Inc.,* Civ. Action No. 2:03–cv–00437 (E.D. Tex.).

Defendant Asus Computer International's Invalidity Contentions and Disclosures Pursuant to P.R. 3–3 and 3–4, dated Oct. 22, 2007, *LaserDynamics, Inc.* v. *Asus Computer International et al,* Civ. Action No. 2:06–cv–00348–TJW–CE (E.D. Tex.).

Defendants Quanta Storage America, Inc. and Quanta Computer USA, Inc's Preliminary Invalidity Contentions Pursuant to Patent Local Rule 3–3 and Related Document Production Pursuant to Patent Local Rule 3–4, dated Oct. 22, 2007, *LaserDynamics, Inc.* v. *Asus Computer International et al.,* Civ. Action No. 2:06–cv–00348–TJW–CE (E.D. Tex.).

"IBM scientists demonstrates multilevel optical discs," Microelectronics Journal, vol. 25, No. 6, pp. 29–30 (1994) http://www.almaden.ibm.com/vis/models/multi.html.

P. Asthana, "A long road to overnight success," IEEE Spectrum, vol. 31, No. 10, pp. 60–66 (Oct. 1994).

P. Asthana and B. Finkelstein, "Superdense Optical Storage," IEEE Spectrum, vol. 32, No. 8, pp. 25–31 (Aug. 1995).

R. A. Bowers, "Hype and Video on CD," CD–ROM Professional (Jun. 1995).

S. Homan and A.E. Willner, "High–Capacity Optical Storage Using Multiple Wavelengths, Multiple Layers and Volume Holograms," Electronic Letters, vol. 31, No. 8, pp. 621–623 (Apr. 1995).

S. Homan and A.E. Willner, "High–Capacity Optical Storage Using Multiple Wavelengths, Multiple Layers and Volume Holograms," Proceedings of the SPIE, Optical Data Storage '95, vol. 2514, pp. 184–190 (Sep. 1995).

N.K. Arter and M.J. Herman, "Detection of Optical Disk Type," IBM Technical Disclosure Bulletin, vol. 29, No. 3 (Aug. 1986).

Wayne I. Imaino, et al., "Extending the Compact Disk Format to High Capacity for Video Applications," Proceedings of the SPIE, Topical Meeting on Optical Data Storage, vol. 2338, pp. 254–259 (Oct. 1994).

V.B. Jipson, "Drive Technologies for the Future," Proceedings of the SPIE, Optical Data Storage '95, vol. 2514, pp. 2–3 (Sep. 1995).

T. Katayama, et al., "High Precision Tracking Control System for Digital Video Disk Players," IEEE Transactions on Consumer Electronics, vol. 41, No. 2, pp. 313–321 (Mar. 1995).

Yoshiaki Komma, et al., "Dual Focus Optical Head for 0.6mm and 1.2mm Disks," Proceedings of the SPIE, Topical Meeting on Optical Data Storage, vol. 2338, pp. 282–288 (Oct. 1994).

Peter D. Lubell, "The Gathering Storm in High–Density Compact Disks," IEEE Spectrum, vol. 32, No. 8, pp. 32–37 (Aug. 1995).

T.D. Milster, "Design Issues in Optical Data Storage," Proceedings of the SPIE, vol. 2383, pp. 382–389, Micro–Optics/Micromechanics and Laser Scanning and Shaping (May 1995).

Dana J. Parker, "High–Density & Re–Inventing the Disc," CD–ROM Professional (Jun. 1995).

Robert Pattern, "Sony Stands by its DVD Standard," Electronics, vol. 68, No. 5 (Mar. 13, 1995).

H. Rosen, et al.,"Multilayer Optical Recording (MORE)," Proceedings of the SPIE, vol. 2514, Optical Data Storage '95, pp. 14–19 (Sep. 1995).

M. Ross and D. Berman, "IBM's Multilevel Optical Disk Named 'Best of What's New'," Business Wire (Nov. 1994).

M. Ross, "Taking Optical Storage to Higher Levels," IBM Research Magazine, No. 2 (1994).

Kurt A. Rubin, et al., "Multilevel Volumetric Optical Storage" Proceedings of the SPIE, vol. 2338, 1994, Topical Meeting on Optical Data Storage, pp. 247–253 (Oct. 1994).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 3 is confirmed.

Claim 1 is cancelled.

Claim 2 was not reexamined.

\* \* \* \* \*